United States Patent [19]

Jackson

[11] 3,853,304
[45] Dec. 10, 1974

[54] MULTI-SHEAVE AERIAL BLOCK

[75] Inventor: Richard L. Jackson, Lewisburg, Ohio

[73] Assignee: Jackson Communication Corporation, Brookville, Ohio

[22] Filed: Dec. 4, 1972

[21] Appl. No.: 311,804

[52] U.S. Cl.............. 254/193, 174/41, 248/61, 254/134.3 PA, 254/190 R, 254/198
[51] Int. Cl............................................. B66d 1/36
[58] Field of Search........ 254/190 R, 192, 193, 195, 254/197, 134.3 R, 134.3 PA, 194, 198; 248/61, 55; 174/40 R, 41

[56] References Cited
UNITED STATES PATENTS

| | | | |
|---|---|---|---|
| 3,095,471 | 6/1963 | Price | 248/61 X |
| 3,098,638 | 7/1963 | McAuley | 254/198 X |
| 3,146,994 | 9/1964 | Sherman | 174/41 X |
| 3,199,841 | 8/1965 | McKean | 254/193 |

OTHER PUBLICATIONS
Model MH-303, Spacer Type Aerial Cable Stringing Block, Manufactured by Sherman & Reilly, Inc. Chattanooga.

Primary Examiner—Richard A. Schacher
Assistant Examiner—Jeffrey V. Nase
Attorney, Agent, or Firm—Biebel, French & Bugg

[57] ABSTRACT

A multi-sheave aerial block in which keepers are provided extending in overlying relationship to each of the sheaves to prevent inadvertent displacement of cables from the grooves in the sheaves. In one embodiment of the invention all of the keepers are movable simultaneously from their overlying position with respect to the sheaves to simultaneously expose all of the sheaves for the placement or removal of cables in or from the grooves thereof. In another embodiment of keepers are grouped in two sets, one set of keepers projecting from each side of the block, and all the keepers in each group are movable simultaneously from their positions overlying the sheaves on that particular side of the block. In both embodiments, locking means are provided to prevent inadvertent displacement of the keepers.

15 Claims, 8 Drawing Figures

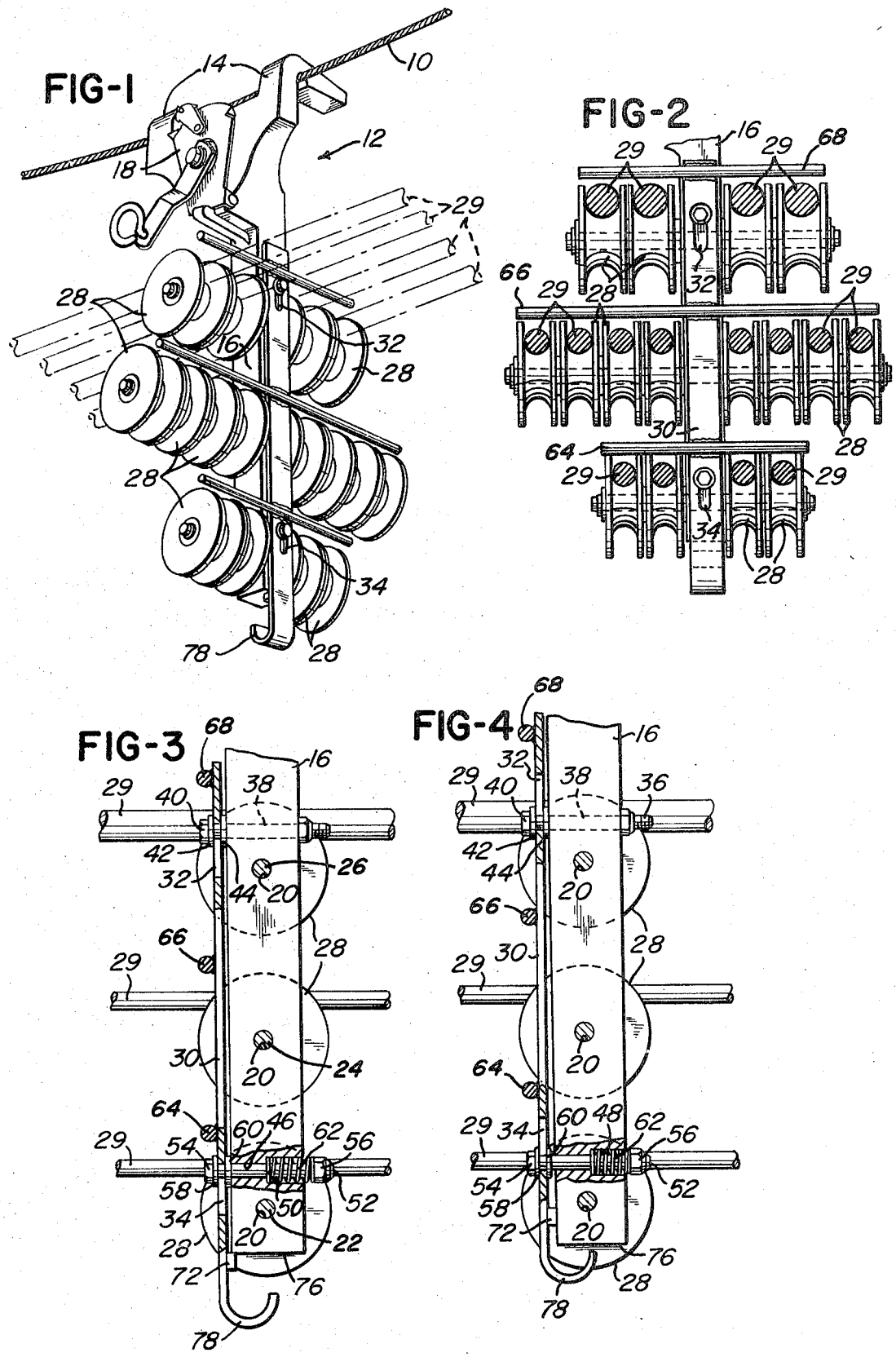

MULTI-SHEAVE AERIAL BLOCK

BACKGROUND OF THE INVENTION

In the stringing of aerial cable, such as coaxial cable, an aerial block is usually installed on an existing supporting strand or messenger and the cables to be attached to the messenger are temporarily suspended beneath it by placing the cables in grooved rollers or sheaves rotatably mounted on the blocks. U.S. Pat. No. 3,146,994 shows a block of this type.

It will be apparent that the cables received in the grooves of the sheaves might be accidentally displaced therefrom, resulting in possible damage to the cable. One type of cable block, known as model MH-303 Spacer Type Aerial Cable Stringing Block, manufactured by Sherman & Reilly, Inc., Chattanooga, Tenn., utilizes spring loaded, self-centering rods which project over the cable supporting sheaves. With this type of construction, however, each of the keepers must be manipulated separately to permit a cable to be placed in the sheave grooves.

SUMMARY OF THE INVENTION

A cable block in accordance with the present invention includes a plurality of grooved sheaves rotatably mounted on opposite sides of a base frame of the block and a plurality of keepers also projecting from opposite sides of the base frame in overlying relationship to the grooved sheaves to prevent inadvertent displacement of cables from the sheaves.

In one embodiment of the invention the keepers are mounted on a plate member which is slidably mounted on the base frame so that by sliding the plate member all of the keepers are moved simultaneously from their overlying position with respect to the sheaves. Cables may then be installed in the grooves of the sheaves and all of the keepers moved simultaneously back into their operative position overlying the sheaves.

In another embodiment of the invention the base frame of the block is formed as two depending bars, with the sheaves mounted on axles projecting outwardly from each of the bars. The keepers for the rollers mounted on each bar are grouped in separate sets with all of the keepers in a single set fixed to a pivot rod which extends perpendicularly with respect to the keeper rods.

The pivot rods are mounted in collars on their respective base frame bars for rotational movement about their axes. At one end of each of the pivot bars a slot is formed which aligns with a pin diametrically positioned with respect to the pivot rod when the keepers are in position overlying their respective sheaves. A spring urges each pivot rod toward its lock pin so that when the keepers are in their operative position overlying their respective sheaves the pin is received in the groove in the end of the pivot rod. This prevents inadvertent movement of the keeper rods from their operative position.

Similarly, in the case of the first embodiment described above, locking means is provided to prevent inadvertent sliding of the plate member along the base frame. The locking means includes a stop fixed to one end of the plate member which abuts against a lower end of the base frame when the keepers mounted on the plate member are in their operative position.

To disengage the stop from the bottom of the base frame, the plate member may be pushed away from the base frame, overcoming the tension of a spring which tends to urge the plate member into contact with the base frame. When the plate member is pushed away from the base frame, the stop member clears the end of the base frame to permit the entire plate member and keeper rods attached thereto to slide upwardly away from their respective sheaves.

BRIEF DESCRIPTION OF THE DRAWINGS

FIG. 1 is a perspective view of an aerial block in accordance with the present invention suspended from a messenger and carrying a plurality of cables;

FIG. 2 is a front view of the block of FIG. 1;

FIG. 3 is a side view of the block of FIG. 1 with parts in section and with the keepers overlying the sheaves;

FIG. 4 is a view similar to FIG. 3 but with the plate member shifted from its locked position;

DESCRIPTION OF THE PREFERRED EMBODIMENTS

Figure 5:
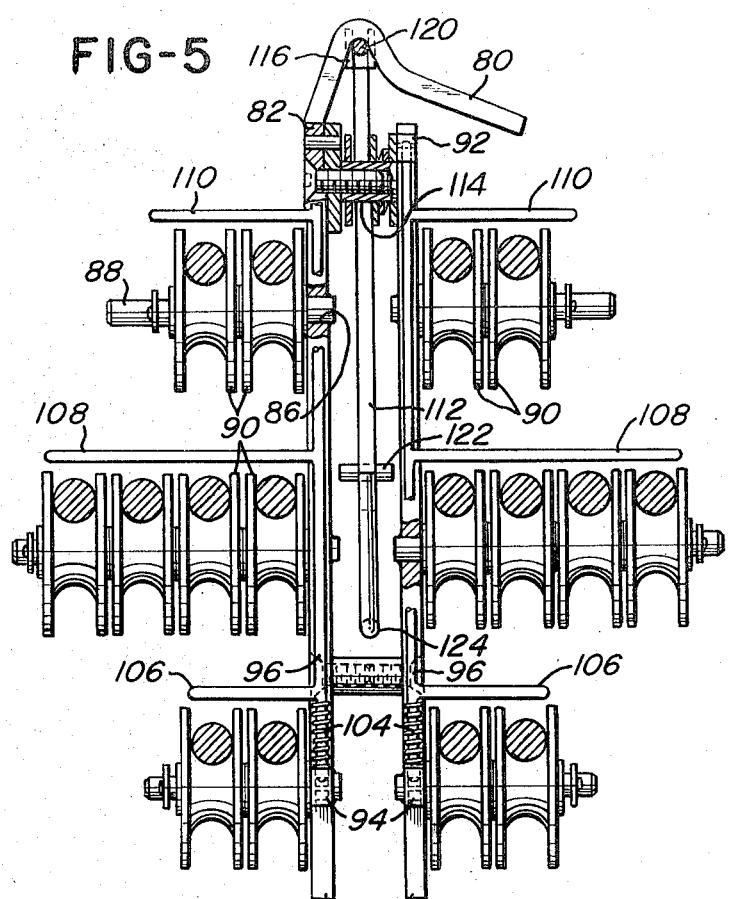
FIG. 5 is a front view of a second preferred embodiment of the invention with parts in section.

With reference to FIGS. 1 through 3 of the drawings, it will be seen that in a typical installation a messenger cable 10 will be provided attached to and extending between a pair of poles, not shown. The aerial block 12 will be attached to the messenger by means, such as the hooks 14 which engage over the messenger, and the block 12 will be provided with a depending main or base frame 16 and means, such as the lock 18 for preventing undesired movement of the block along the messenger cable.

In the embodiment of FIGS. 1 through 3, the base frame 16 is formed as a solid casting of aluminum or the like having openings 20 formed therethrough at vertically spaced intervals which receive axles 22, 24 and 26 of any desired length. Each of the axles 22-26 have rotatably mounted thereon a plurality of grooved rollers 28 adapted to receive cables 29 as shown in FIG. 1 of the drawings. The grooves in the rollers 28 have a configuration which closely matches the exterior configuration of the cables 29 to lessen cable damage.

Overlying one face of the base frame 16 is an elongated flat plate member 30 having a pair of longitudinally extending slots 32 and 34 formed adjacent its upper and lower ends, respectively. A headed stud, bolt, or the like 36 is received in an opening 38 formed through the base frame 16 at right angles to the openings 20. The head 40 of the bolt 36 overlies the portion of the plate member 30 adjacent the slot 32 and, if desired, washers 42 and 44 may be interposed between the head 40 and the plate member 30 and the adjacent portion of the base frame 16.

Adjacent its lower end an opening 46 is formed through the base frame having an enlarged portion 48 forming a shoulder 50. A bolt 52 having a head 54 extends through the opening 34 and the opening 46 is provided with a nut 56 at its opposite end and a pair of washers 58 and 60 disposed on opposite sides of the plate member 30. A coil spring 62 encircles a portion of the bolt 52 within the enlarged section 48 of the opening 46 and urges the bolt 52 and the plate member 30 to the right as seen in FIG. 3 of the drawings.

A plurality of keeper rods 64, 66 and 68 are attached to the plate member 30, as by welding, and extend across the base member in overlying relationship to the sheaves 28 when the plate member 30 is in the position shown in FIG. 2 of the drawings. A stop member 72 is attached by welding or the like adjacent the bottom end of the plate member 30 and abuts against a lower edge 76 of the base frame 16 when the keepers 64-68 are in their operative position overlying their respective sheaves.

When it is desired to expose the grooves of the sheaves for the placement or removal of cables, the lower, hooked end 78 of the plate member may be grasped and moved to the left, as seen in FIG. 3, in opposition to the pressure of spring 62 to clear the stop member 72 and allow the entire plate and attached keeper rods to slide upwardly along the base frame 16 to the position shown in FIG. 4.

Thereafter, when it is desired to return the keeper rods to their operative position, the hook 78 can again be grasped and pulled downwardly until the stop member 72 snaps into the position shown in FIG. 3 in engagement with the lower edge 76 of the base frame. Thus, it will be seen that all of the keepers may be moved simultaneously into and out of their operative positions overlying their respective sheaves and that locking means is provided to prevent inadvertent displacement of the keepers from their operative positions.

Turning now to FIGS. 5-8 of the drawings, a second preferred embodiment of the invention will be described. In this embodiment, the messenger engaging hooks 80 are mounted on a cross member 82 from which are suspended a pair of spaced parallel base frame bars 84. Openings 86 are formed through each of the bars 84 at vertically spaced intervals and receive axles 88 which project outwardly thereof and carry sheaves 90 similar to the sheaves 28 described above.

On one of its edges each of the bars 84 has a pair of spaced upper and lower collars 92 and 94 respectively, which receive a pivot rod 96 for rotational movement about the axis thereof. A pin 98 extends through the lower collar 94 and serves as a stop member while a pin 100 extends similarly through the upper collar 92 and serves as a locking pin. The upper end of the pivot rod 96 is slotted as at 102 with the slot 102 aligned with the pin 100 when the pivot rod is positioned as seen in FIG. 5 of the drawings. A spring 104 encircles the lower end of each of the pivot rods 96 and bears against a lowermost keeper rod 106 and at its lower end against the top of the lower collar 94. The keeper rod 106 is attached to and extends perpendicularly from the rod 96 as do upper keepers 108 and 110.

With the above construction, it will be apparent that the spring 104 urges the rod 96 toward the locking pin 100, so that when the keeper rods 106-110 are in their operative positions overlying their respective sheaves the pin 100 will be received in the slot 102. However, when it is desired to pivot the pivot rod 96 and the keeper rods attached thereto, one of the keeper rods can be grasped and pulled downwardly enough to clear the pin 100 from the slot 102, allowing the rod 96 to rotate about its axis in the collars 92 and 94 and clearing the keepers 106-110 from their operative positions overlying their respective sheaves. Of course, when it is desired to return the keeper rods to their operative position it is merely necessary to again rotate the pivot 96 about its axis until the rod snaps into engagement with the locking pin 100.

A cam lever 112 is pivoted, as at 114, intermediate the bars 84 and carries a cam 116 adjacent its upper end with the cam 116 being grooved as at 118 to engage a messenger 120. With this construction when the cam lever is pivoted toward a position parallel to the side bars 84 it will engage the messenger 10 intermediate the hooks 80 and anchor the block against movement along the strand 10.

Figure 6:
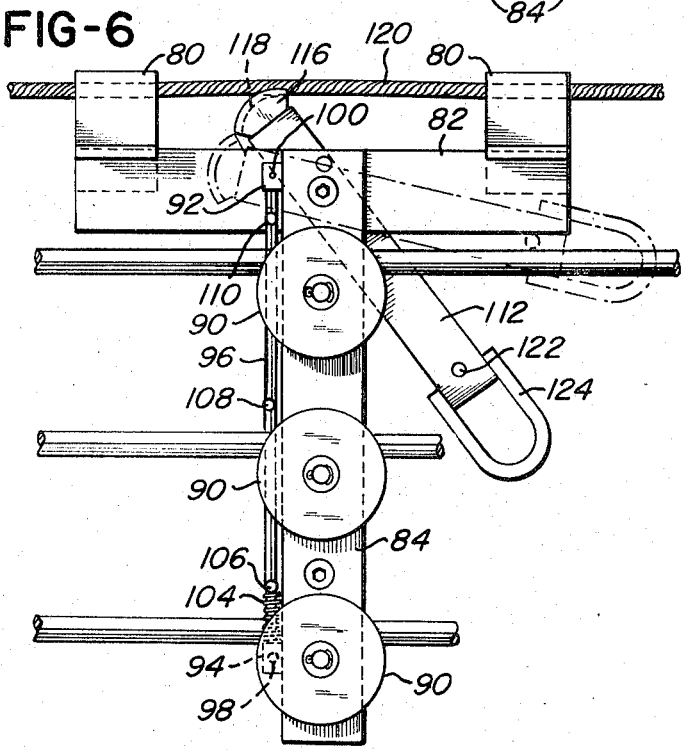
FIG. 6 is a side view of the embodiment of FIG. 5.
Figure 7:
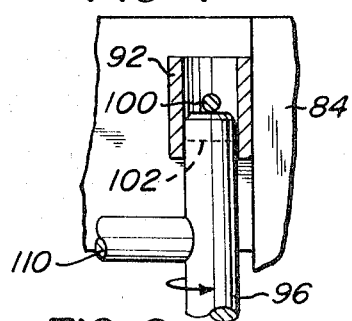
FIGS. 7 and 8 are enlarged views of the locking mechanism of the embodiment of FIG. 5.
Figure 8:
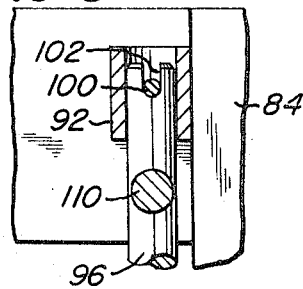

It will also be noted from FIGS. 5 and 6 that lever 112 is provided with a stop 122 adjacent its lower end. This stop engages cross member 82, as seen in phantom lines in FIG. 6, when the block is lifted by the loop 124 to place it over the messenger. The lever can be pivoted to either side of the bars 84 with the stop 122 engaging either end of the cross bar 82, depending upon the direction of movement against when it is desired to prevent movement of the block along the messenger. For example, with the lever 112 pivoted to the right as seen in FIG. 6, movement of the block along the messenger to the left is resisted.

From the above it will be apparent that the present invention provides a multi-sheave, multi-keeper aerial block in which all or at least several of the keepers are movable simultaneously in a single operation.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An aerial block comprising:
   a. strand engaging hook means,
   b. an elongated base frame extending from said hook means substantially vertically downwardly during normal use of said block,
   c. a plurality of axles projecting outwardly from said elongated base frame in vertically spaced, parallel relationship to each other and substantially perpendicular with respect to a strand engaged by said hook means,
   d. a plurality of grooved sheaves rotatably mounted on said axles for simultaneously receiving a plurality of cables with each of the cables being separately received in a groove of a sheave,
   e. a single keeper means associated with a plurality of said sheaves received on vertically spaced axles for retaining cables in the grooves of the vertically spaced sheaves when said keeper means is positioned in cable retaining relationship thereto, and f. means mounting said keeper means on said aerial block for moving said keeper means simultaneously from said cable retaining relationship to said vertically spaced sheaves with which it is associated to a second position spaced therefrom and permitting access thereto for the placement or removal of cables in the grooves thereof.

2. The block of claim 1 further comprising:

a. means for locking said aerial block against displacement thereof along a strand engaged by said hook means thereof.

3. In an aerial block including a base frame and means for engaging a supporting strand to suspend said base frame from said strand the improvement comprising:
   a. a plurality of axles projecting from said base frame in spaced parallel relationship to each other and substantially perpendicular with respect to a strand from which said base frame is suspended,
   b. a plurality of grooved sheaves rotatably mounted on said axles for simultaneously receiving a plurality of cables,
   c. keeper means for retaining cables in the grooves of said sheaves in at least one position of said keeper means,
   d. a plate member having said keeper means mounted thereon, and
   e. means mounting said plate member for sliding movement with respect to said base frame in a direction perpendicular to said axles for moving said keeper means from said one position thereof to a second position thereof spaced from said one position and permitting access to said sheaves for the placement or removal of cables.

4. The block of claim 3 wherein said plate member mounting means comprises:
   a. means defining a slotted opening through said plate member, and
   b. a headed stud mounted on said base frame and projecting through said slotted opening with the head of said stud overlying a portion of said plate member adjacent said slotted opening.

5. The block of claim 4 further comprising:
   a. lock means for retaining said keeper means against inadvertent displacement from said one position, thereof.

6. The block of claim 5 wherein said lock means comprises:
   a. a stop member on said plate member engaging said base frame when said keeper means are in said one position and preventing said sliding movement of said plate member along said base frame, and
   b. resilient means resisting separation of said stop member from said base frame.

7. In an aerial block including a base frame and means for suspending said base frame from a supporting strand, the improvement comprising:
   a. an elongated portion of said base frame extending downwardly from said suspending means,
   b. a plurality of axles projecting outwardly from said elongated portion of said base frame,
   c. said axles being positioned beneath said suspending means in vertically spaced relationship to each other,
   d. a plurality of grooved sheaves rotatably mounted on said vertically spaced axles and permitting the support simultaneously of a plurality of vertically spaced cables beneath a supporting strand,
   e. keeper means associated with the vertically spaced grooved sheaves for retaining cables in the grooves of said sheaves with said keeper means in a cable retaining position thereof, and
   f. means for moving said keeper means from said cable retaining position simultaneously with respect to a plurality of said vertically spaced grooved sheaves to a position exposing said plurality of vertically spaced grooved sheaves for the removal or placement of cable.

8. The block of claim 7 wherein said means for moving said keeper means comprises:
   a. a pivot rod having at least some of said keeper means mounted thereon and projecting substantially perpendicularly therefrom, and
   b. means mounting said pivot rod for rotation about the longitudinal axis thereof to pivot said keeper means carried thereby from said one position to said second position.

9. The block of claim 8 further comprising:
   a. lock means for retaining said keeper means against inadvertent displacement from said one position thereof.

10. The block of claim 9 wherein said lock means comprises:
    a. means defining a slot in one end of said pivot rod,
    b. a locking pin extending diametrically with respect to said pivot rod adjacent said one end thereof,
    c. said pin being aligned with said slot when said keeper means are in said one position, thereof,
    d. means urging said rod toward said pin to allow said pin to enter said slot when said pin and slot are aligned.

11. The block of claim 8 wherein:
    a. said base frame includes a pair of spaced bars depending from said strand engaging means,
    b. said axles project outwardly from said bars, and
    c. one of said pivot rods is mounted on each of said bars.

12. The block of claim 11 further comprising:
    a. a cam lever pivotally mounted between said bars,
    b. a cam carried by an upper end of said lever to contact a strand engaged by said engaging means and lock said base frame against movement along a strand.

13. The block of claim 12 further comprising:
    a. a cross bar extending across said base frames, and
    b. a stop projecting from said lever and engageable with said cross bar.

14. The block of claim 7 further comprising:
    a. lock means for retaining said keeper means against inadvertent displacement from said cable retaining position.

15. The block of claim 7 wherein:
    a. said axles project from opposite sides of said base frame, and
    b. said keeper means project from opposite sides of said plate member.

* * * * *